United States Patent
Spindelberger

[15] 3,672,258
[45] June 27, 1972

[54] CONTROL MECHANISM FOR ALTERNATELY APPLYING A PRESSURE MEDIUM UPON THE OPPOSITE LATERAL SIDES OF A ROTARY PISTON

[72] Inventor: Franz Spindelberger, Zurich-Hongg, Switzerland

[73] Assignee: E. Heiss-Thurow, Zurich, Switzerland

[22] Filed: Oct. 8, 1969

[21] Appl. No.: 864,792

[30] Foreign Application Priority Data

May 13, 1969 Germany................P 19 24 402.1

[52] U.S. Cl.................................91/355, 91/398, 91/470
[51] Int. Cl..............................................F15b 11/15
[58] Field of Search................................91/355, 398, 470

[56] References Cited

UNITED STATES PATENTS

| 1,905,133 | 4/1933 | Bishop et al. | 91/355 |
| 2,649,076 | 8/1953 | Dupre | 91/355 |
| 2,729,198 | 1/1956 | Faccou | 91/355 |
| 3,050,036 | 8/1962 | Faisandier | 91/355 |

*Primary Examiner*—Paul E. Maslousky
*Attorney*—Craig, Antonelli and Hill

[57] ABSTRACT

A very simple servomechanism for alternately conducting a pressure medium, for example, compressed air, to the opposite lateral sides of a rotary piston for turning this piston back and forth over specific angular distances especially for indexing purposes on a machine tool. The servomechanism consists of a valve unit which may be easily mounted in an indexing apparatus or machine tool itself and consists of simple mechanical means including a rotary servo valve.

8 Claims, 12 Drawing Figures

INVENTOR
FRANZ SPINDELBERGER

BY Craig, Antonelli, Stewart & Hill
ATTORNEYS

INVENTOR
FRANZ SPINDELBERGER

INVENTOR

FRANZ SPINDELBERGER

BY Craig, Antonelli, Stewart & Hill
ATTORNEYS

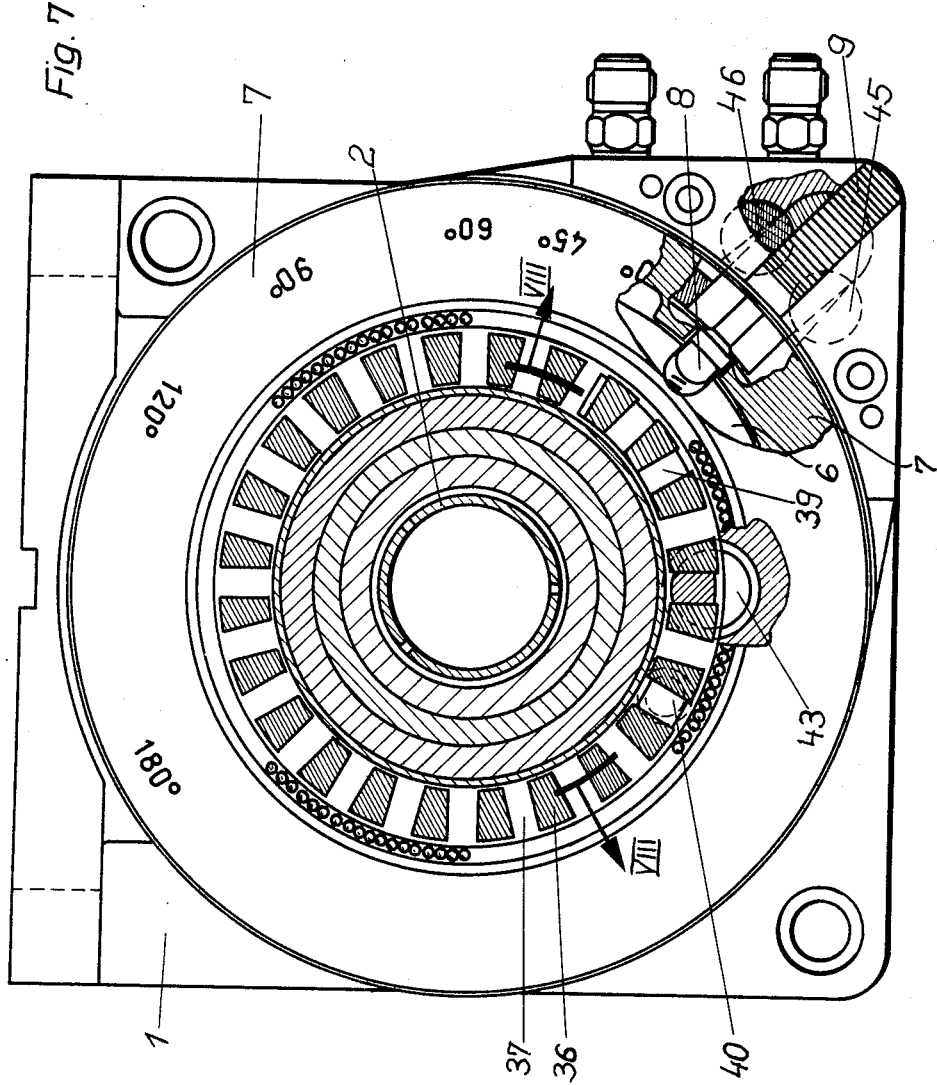

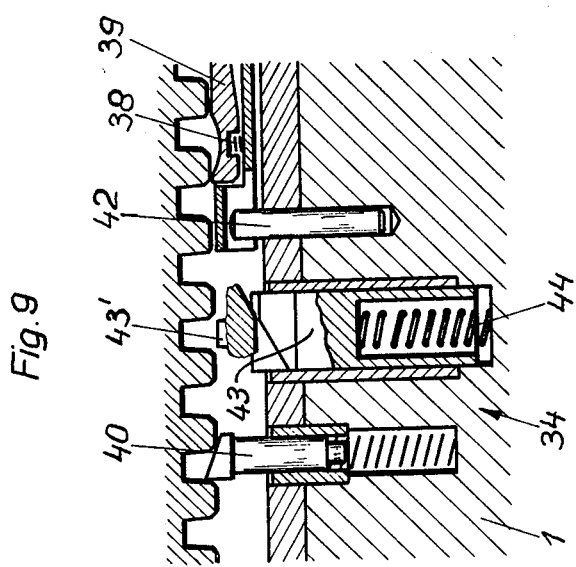
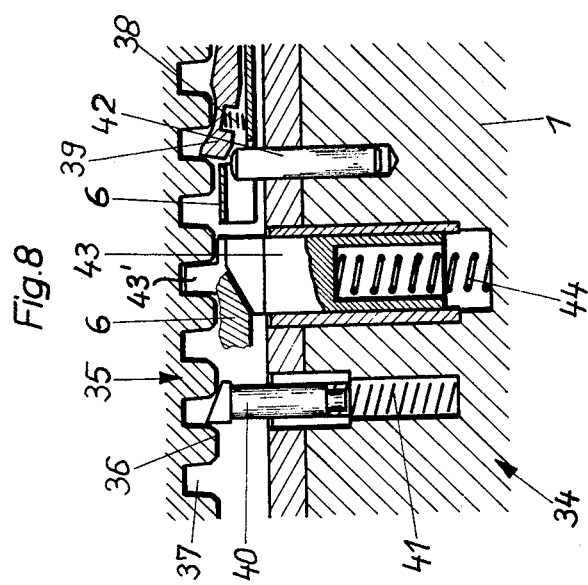

INVENTOR.
FRANZ SPINDELBERGER

CONTROL MECHANISM FOR ALTERNATELY APPLYING A PRESSURE MEDIUM UPON THE OPPOSITE LATERAL SIDES OF A ROTARY PISTON

The present invention relates to a control mechanism for alternately conducting a pressure medium to the opposite lateral sides of a rotary piston, especially of an indexing apparatus for machine tools, so as to turn this piston back and forth about an axis within a sector-shaped chamber.

The control of the rotary movements of a rotary piston involves considerable difficulties, especially in an indexing apparatus for a machine tool. Prior to this invention, these difficulties could be overcome only by means of very expensive additional control mechanisms. Such a control mechanism must be designed so as to ensure that the rotary piston will always reach its predetermined position and will also return to its original position. The mere fact that the rotary piston must travel different distances in accordance with different indexing angles already requires a rather complicated and expensive control mechanism which permits the pressure medium to act for different lengths of time upon the rotary piston. In addition, the control mechanism must be designed so as to insure that after the workpiece which is clamped in the indexing apparatus has carried out its rotary movements to a certain position, it will remain in this position until the required operation has been carried out thereon. In order to carry out these functions, it has previously been necessary to provide an additional electropneumatic control apparatus.

It is an object of the present invention to replace the known complicated control apparatus by a simple servomechanism which is adapted to conduct a pressure medium alternately to the opposite lateral surfaces of the rotary piston over turning the same back and forth for predetermined angular distances, and which consists of simple mechanical elements, and it is a further object of the invention to design this servomechanism as a unit which may be easily installed in the indexing apparatus or the machine tool itself.

For attaining these objects, the invention resides in the provision of a control valve which is connected with the supply line of the pressure medium and adapted to be turned to different positions by cam means which are connected to the rotary piston and, when turned to one or the other of its end positions, to direct the flow of the pressure medium to one or the other lateral surface of the rotary piston. These cam means are designed so as to permit the control valve to be turned in one direction from its basic position to its opposite end position and then to be turned back from the latter only to a central position in which it blocks the flow of pressure medium to both sides of the piston. The invention further resides in the provision of an additional, independently controlled device for returning the rotary piston from this central position to its basic position.

This mechanism which consists of simple mechanical elements carries out the required functions very reliably. When the control valve is in its basic position, it permits the pressure medium, for example, compressed air, to flow toward and act upon one lateral surface of the piston so as to effect the desired indexing movement of a workpiece. Thereafter, a cam which is connected to the rotary piston will turn the control valve in the direction toward its opposite end position in which it permits the pressure medium to flow to the other lateral surface of the piston so that the piston will be returned. The cam which then becomes active and which is likewise rigidly connected to the rotary piston turns the control valve, however, only to its central position in which its valve ports leading to the opposite piston surfaces are closed so that the piston is prevented from moving in either direction. The workpiece may then be machined in the particular preselected indexing position. The pressure medium then remains shut off until the independently controlled device is actuated and the control valve is thereby returned to its basic position.

In order to adjust the workpiece to different index angles, it is advisable to provide suitable means which permit the cam which effects the movement of the control valve from its normal position to its opposite end position to be adjusted relative to the rotary piston.

According to an especially advantageous embodiment of the invention, the independently controlled device comprises a piston which is slidable in the axial direction within the control valve and is adapted to be shifted by the pressure medium against the action of a spring, and is provided with simple guiding means which are effective when the pressure medium is shut off and then effect the return of the control valve from its central position to its basic position. For actuating the indexing apparatus, this embodiment of the invention only requires a device which for starting each indexing movement only shuts off the flow of pressure medium, for example, compressed air, for a short time and then turns it on again.

The mentioned guiding means may be made of a very simple construction by providing a piston-like pin which is guided within the bottom of the valve housing and is interposed between the spring and the mentioned piston which is axially slidable within the control valve, and by providing this pin with a crosspin which, when the piston is under pressure, rests in a fixed position within a recess of a corresponding shape in the bottom of the valve housing and, when the piston is not under pressure, slidably engages with inclined cam surfaces on the control valve.

For additionally ensuring that the control valve will remain in its central position in which it closes both valve ports leading to the rotary piston, the slidable piston within the control valve may be prevented from turning relative to this valve, and when it is under pressure in the central position of the control valve, this piston may additionally engage into fixed locking means whereby the control valve will be locked additionally in its central position. These locking means are preferably made in the nature of a claw coupling and consist of projections or recesses on or in the surface of the slidable piston opposite to its surface which is acted upon by the pressure medium, and of corresponding recesses or projections in or on the fixed bottom of the valve housing. When the control valve is in its central position these projections and recesses engage into each other and thus prevent the valve from turning.

According to another feature of the invention, the control valve when in its basic position and in its end position is operatively associated in such a manner with air discharge openings which connect the opposite sides of the rotary piston with the atmosphere that it closes those discharge openings which are connected with the side of the piston which is then acted upon by compressed air and holds the other discharge openings in the open position which are connected with the side of the piston which is then not acted upon by compressed air.

The features and advantages of the present invention will become more apparent from the following detailed description thereof which is to be read with reference to the accompanying drawings, in which FIG. 1 shows a longitudinal, axial section of an indexing apparatus which is equipped with a servomechanism according to the invention;

FIG. 7 shows a cross section of the indexing apparatus which is taken along the line VII—VII of FIG. 1;

FIG. 8 shows a cross section which is taken along the line VIII—VIII of FIG. 7;

FIG. 9 shows a cross section which is similar to that of FIG. 8, but taken in another operating position of the indexing means;

Figure 1:
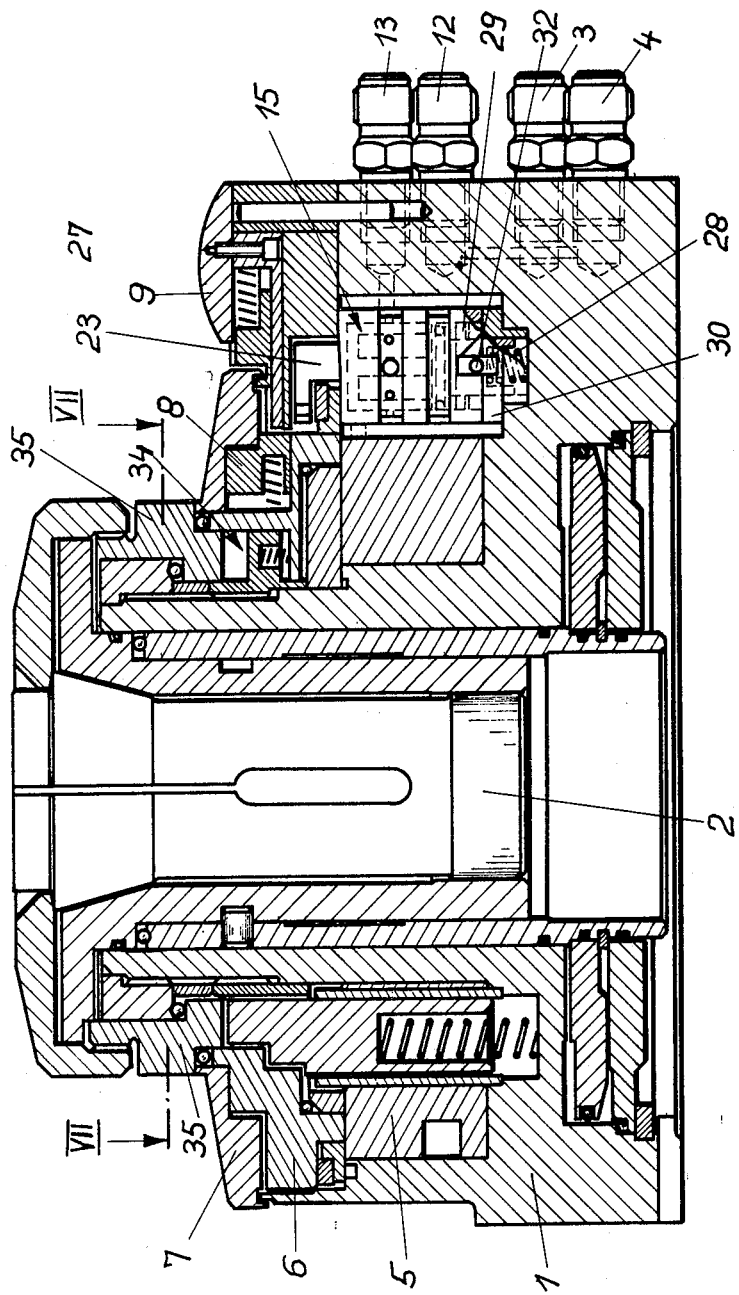
Figure 2:
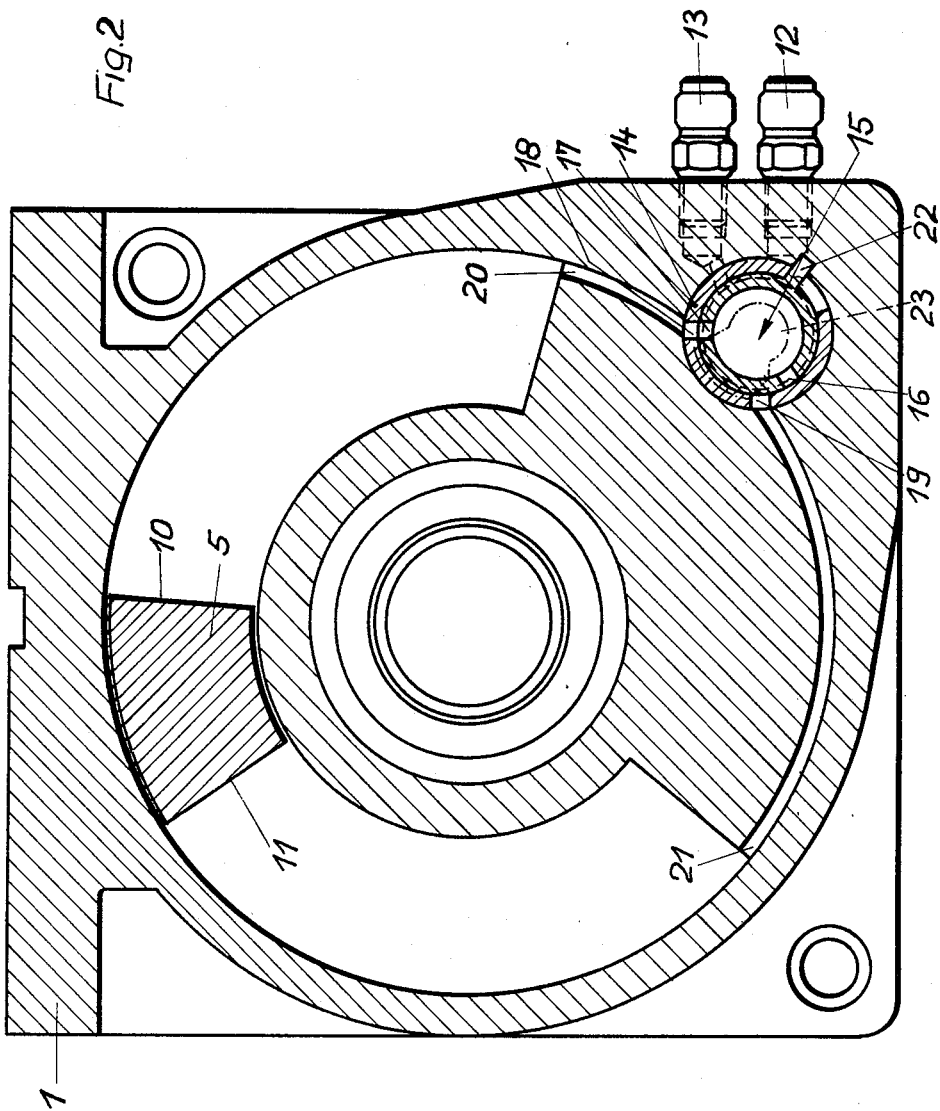
FIG. 2 shows a cross section of the apparatus as illustrated in FIG. 1.
Figure 3:
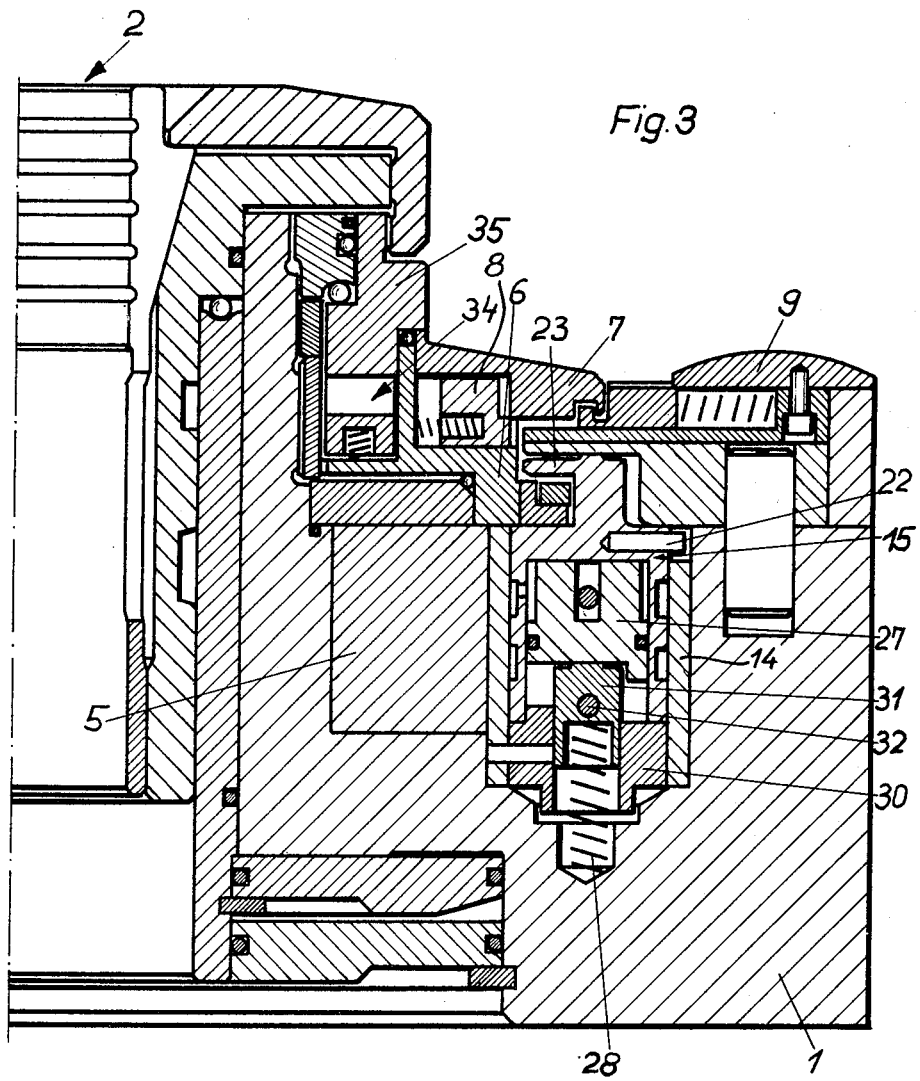
FIG. 3 shows a longitudinal section of a part of the apparatus as illustrated in FIG. 1 but on a larger scale.

The indexing apparatus which is illustrated in the drawings and forms one preferred embodiment of the invention comprises a housing 1 in which a collet 2 is mounted which is adapted to be closed pneumatically so as to grip a workpiece and is connected in a manner not shown to air-line connection fittings 3 and 4. Collet 2 together with the workpiece is movable in a counterclockwise direction by means of a rotary piston 5 which is shown in FIG. 2 more clearly than in FIG. 1 but in a different operating position. Piston 5 is secured to a driving ring 6 which, in turn, is connected to a selecting ring 7. By shifting a control knob 9 in one direction, i.e., radially inwardly, the connection between the driving ring 6 and the selecting ring 7 by means of a toothed locking element 8 may be severed so that the selecting ring 7 may then be adjusted relative to the driving ring 6. This driving ring 6 is also provided with locking means, as will be later described with reference to FIGS. 8 and 9, which are adapted to limit the indexing movement of the rotary piston 5 and thus also of the workpiece.

For acting upon the lateral surfaces 10 and 11 (FIG. 2) of the rotary piston 5, preferably by means of compressed air, the housing 1 is provided with an air inlet connection fitting 12 (FIGS. 1 and 2) and with an air discharge connection fitting 13. For starting the indexing movement, the compressed air which is supplied from the inlet 12 at first acts upon the side 10 of piston 5 so that the latter will be moved in a counterclockwise direction as viewed in FIG. 2. Thereafter, the direction of the flow of compressed air is changed so as to act upon the other side 11 of piston 5 for returning the piston to its original position. The indexing apparatus is designed so that the collet 2 together with the workpiece can carry out rotary movements only in the counterclockwise direction. Therefore, with each movement of piston 5 in the counterclockwise direction, collet 2 together with the workpiece will be turned through a certain angle in the same direction.

Figure 10:
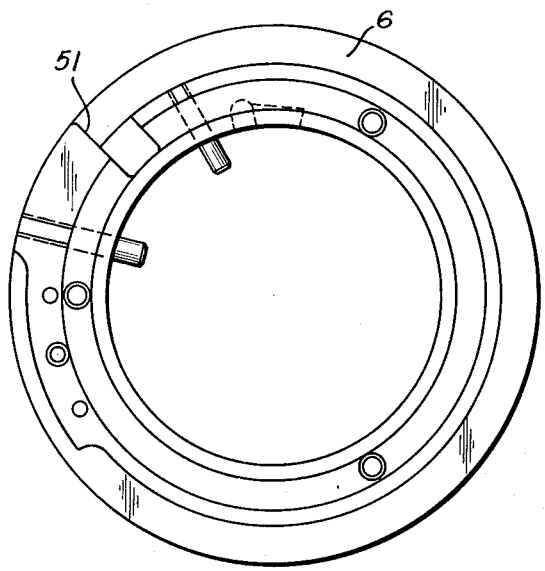
FIG. 10 is a plan view of the driving ring illustrating the valve actuating cam means.
Figure 11:
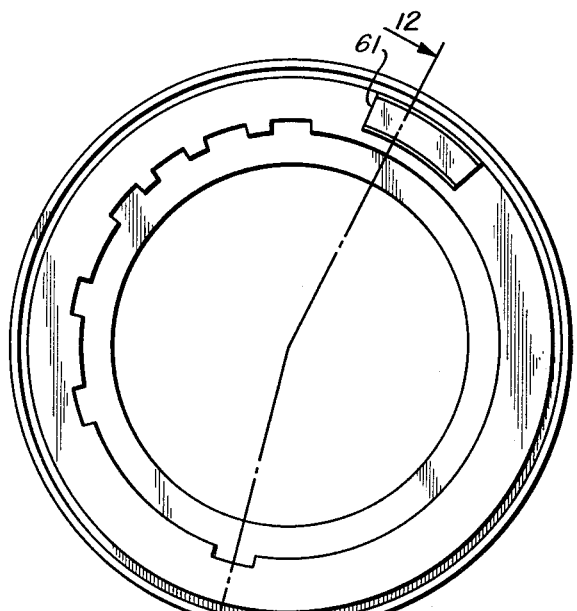
FIG. 11 is a plan view of the selecting ring also illustrating the valve actuating cam means.
Figure 12:
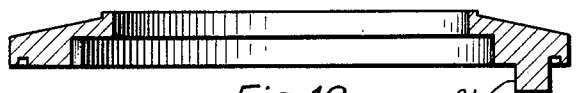
FIG. 12 is a cross-sectional view taken along line XII—XII of FIG. 11.

The alternate action of the compressed air upon the piston surfaces 10 and 11 is effected by means of a special control or servo unit which is mounted within the housing 1 of the indexing apparatus and is interposed in the air supply line which is connected to the air inlet 12. This control unit essentially consists of a valve member generally designated by reference numeral 15 (FIGS. 1, 2, 3, and 4) which is rotatable within a cylindrical bushing or valve housing 14 (FIG. 2) and in its basic position connects the air inlet 12 with the piston surface 10 and in its other end position with the piston surface 11. Valve member 15 is for this purpose provided with a pair of bores 16 and 17 (FIG. 2), one of which must be moved into alignment with a bore 18 or the other with a bore 19 in bushing 14. These bores 18 and 19 communicate respectively with an air channel 20 (FIG. 2) and with an air channel 21 (FIG. 2) in the housing 1 leading to a sector-shaped chamber within which piston 5 is movable and thus to the opposite sides 10 and 11 of piston 5. Valve member 15 may be turned from one end position to the other by cam means 51 (FIG. 10) and cam means 61 (FIGS. 11 and 12) which are provided on the driving ring 6 and on the selecting ring 7 and are adapted to act upon a laterally projecting head 23 (FIGS. 1, 2 and 4) of valve member 15 so as to turn the latter in one direction or the other in response to the particular position of piston 5. These cam means 51, 61 are designed so that the cam 61 (FIGS. 11 and 12) which is mounted on the selecting ring 7 which is adjustable relative to the rotary piston 5 will turn the valve member 15 from its basic position as shown in FIG. 2 to its opposite end position, while the cam 51 (FIG. 10) which is mounted on the driving ring 6 which is rigidly connected to piston 5 by means of this driving ring 6, turns the valve member 15 only to its central position in which it closes both bores 18 and 19 in the valve housing 14 so that the supply of compressed air to either of the two piston surfaces 10 and 11 is blocked.

Figure 4:
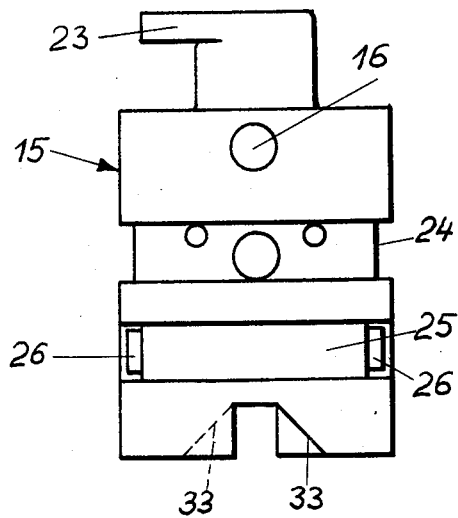
FIGS. 4 to 6 show enlarged side views of several parts of the servomechanism as illustrated in FIGS. 1 to 3.

As illustrated in FIG. 4, valve member 15 is provided with two annular grooves 24 and 25, one above the other. The upper groove 24 is connected with the air inlet 12 and with the two bores 16 and 17 in the upper part of valve member 15, while the lower annular groove 25 serves for closing the air discharge openings (not shown) and is for this purpose provided with segments 26 of a U-shaped cross section which are adapted to close the associated air discharge openings for a certain angular distance when valve member 15 is turned in one direction or the other.

Figure 5:
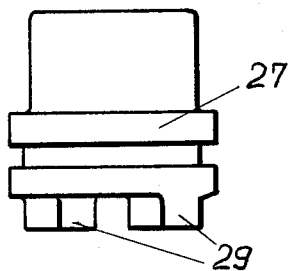
Figure 6:
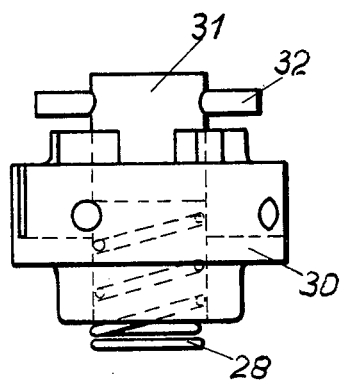

Since the cam 51 which is connected to the driving ring 6 only returns the valve member 15 to its central position, a second, independently acting control device must be provided which finally returns the valve member 15 to its basic position so as to permit a new indexing operation to be started. This second control device consists of a piston 27, as shown in FIG. 5, which is slidable within an upwardly closed chamber in valve member 15 and will be moved downwardly within this chamber by the action of compressed air passing through bores in the bottom of the upper annular groove 24 which is connected with the air inlet 12. When valve member 15 has reached its central position in which no compressed air can pass through its bores 16 and 17, the pressure increases and piston 27 will be moved further downwardly against the action of a spring 28 into corresponding recesses of a connecting member 30 which is rigidly connected to the bushing 14 which is mounted in a fixed position in housing 1. The connecting member 30 is provided with an axial bore in which a piston-like member 31 is slidable which carries the spring 28 and is provided with a transverse pin 31, the two arms of which slidably engage into corresponding recesses in the stationary connecting member 30. If the supply of compressed air is stopped for a short time when a new indexing operation is to be started, spring 28 acting through the piston-like member 31 upon piston 27 will lift the latter. The two arms of pin 32 then engage upon inclined cam surfaces 33 which are provided in the lower edge of valve member 15. By the pressure of pin 32 upon these cam surfaces 33 under the action of spring 28, valve member 15 will be turned back to its basic end position in which a new indexing operation may be started as soon as compressed air is again supplied.

The driving ring 6 which is connected by the locking element 8 to the selecting ring 7 is, in turn, connected by a one-way locking mechanism 34, as illustrated in FIGS. 8 and 9, to an indexing ring 35 which is firmly secured to the collet 2. This locking mechanism 34 is designed so that the indexing ring 35 will be taken along by the driving ring 6 only when piston 5 carries out a rotary movement in the counterclockwise direction, while the indexing ring 35 is locked against turning in the clockwise direction. For this purpose, indexing ring 35 is provided on its lower side with teeth 36 and intermediate tooth gaps 37 into which a tongue 39 which is pivotably mounted on the driving ring 6 is adapted to engage by being pressed upwardly by a spring 38 so as to prevent the indexing ring 35 from turning in its clockwise direction. If the driving ring 6 is turned in its clockwise direction, a slightly concave surface on tongue 39 slides along one of the teeth 36 of ring 35 and tongue 39 is thereby pressed downwardly against the action of spring 38 so as to disengage from the adjacent tooth gap 37. The indexing ring 35 will be locked against any rotary movement in its clockwise direction by means of a pin 40 which is inserted into a socket bore in housing 1 and the head of which is pressed by a spring 41 into a tooth gap 37 of ring 35. Since this head of pin 40 is provided on one side with a vertical stop surface and on its other side with an inclined cam surface, pin 40 only prevents the indexing ring 35 from turning in its clockwise direction, that is, toward the right of FIGS. 8 and 9.

When the driving ring 6 reaches its end position, tongue 39 moves against a stationary pin 42 which in addition to spring 38 presses the end of the tongue into a tooth gap 37 of the indexing ring 35 and thereby absolutely prevents the latter from further turning which might otherwise occur due to the extremely quick movement and would result in faulty indexing. In the end position of driving ring 6, an additional locking pin 43 engages with its head portion 43' under the action of a spring 44 into the opposite tooth gap 37 of indexing ring 35. The lateral surfaces of the head of this locking pin 43 are slightly inclined like the flanks of the teeth 36, for example, at an angle of 4°, so that a very accurate self-locking action will be produced by locking pin 43 under the action of its compression spring 44. When the rotary piston 5 and thus also the driving ring 6 is turned clockwise, i.e., toward the right as viewed in FIGS. 8 and 9, locking pin 43 will be pressed downwardly by the sliding engagement of an inclined cam surface on the driving ring 6 with a similar inclined surface on the head of locking pin 43. In either of the end positions of piston 5, however, the driving ring 6 and the indexing ring 35 will be rigidly and securely locked together. The selecting ring 7 which for determining the indexing degree may be turned relative to the driving ring 6 after the control knob 9 has been shifted forwardly, is provided with outwardly projecting stop surfaces (not shown) which are adapted to abut against stop members 45 and 46, as indicated in FIG. 7, when the selecting ring 7 reaches its end positions. These stop members 45 and 46 are preferably made of a resilient plastic in order to prevent a hard impact when one or the other projecting stop surface on the selecting ring 7 abuts against the associated stop member 45 or 46.

Although my invention has been illustrated and described with reference to the preferred embodiment thereof, I wish to have it understood that it is in no way limited to the details of such embodiment but is capable of numerous modifications within the scope of the appended claims.

Having thus fully disclosed my invention, what I claim is:

1. A control mechanism for alternately conducting a pressure medium to the opposite lateral sufaces of a rotary piston for turning the same back and forth for specific distances within a chamber in a housing, comprising conduit means in said housing for supplying said pressure medium to said chamber at both sides of said piston, a two-way valve member interposed in said conduit means and adapted to be turned back and forth between two end positions and when turned to the first end position forming a basic position permitting said pressure medium to flow only to the part of said chamber at one side of said piston and when turned to the second end position permitting said pressure medium only to flow to the part of said chamber at the other side of said piston, cam means connected to said piston for turning said valve member in one direction from said first end position to said second end position and from said second end position in the opposite direction only back to a central position intermediate said first and second positions in which it interrupts the flow of pressure medium to both parts of said chamber, and additional, independently controlled means for returning said valve member from said central position to said first end position.

2. A control mechanism as defined in claim 1, further comprising means for adjusting said cam means relative to said piston.

3. A control mechanism as defined in claim 1, in which said valve member has a tubular part, said independently controlled means comprising a compression spring, a slidable piston adapted to be acted upon by said pressure medium to slide in the axial direction in said tubular part against the action of said spring, and means for returning said valve member from said central position to said first end position when said pressure medium is shut off.

4. A control mechanism as defined in claim 3, further comprising a valve housing in which said valve member is rotatably guided, said valve housing having a bottom with an axial bore therein, said means for returning said valve member comprising inclined cam surfaces on the free end of said tubular part of said valve member facing said bottom, a cylindrical member interposed between said slidable piston and said spring and slidable in the axial direction but nonrotatable in said bore, and a cross-pin extending transversely through said cylindrical member and adapted, when said pressure medium is shut off and said slidable piston is therefore not depressed against said spring, to be pressed by said spring against said cam surfaces, whereby said valve member is turned back from said central position to said first end position.

5. A control mechanism as defined in claim 4, in which said bottom has a pair of diametrically opposite recesses on its inner side facing said slidable piston, said crosspin being slidable guided in said recesses in the axial direction of said cylindrical member so as to prevent said member and said crosspin from turning.

6. A control mechanism as defined in claim 4, further comprising means for preventing said slidable piston from turning within said valve member, and associated means on said bottom and on the side of said slidable piston facing said bottom adapted to interengage with each other so as to lock said slidable piston against rotation when said pressure medium acts upon the opposite side of said slidable piston when said valve member is in said central position.

7. A control mechanism as defined in claim 6, in which said associated interengageable means are of a nature similar to the two members of a claw coupling and comprise substantially corresponding projections and recesses on said bottom and said bottom-facing side of said slidable piston.

8. A control mechanism as defined in claim 1, in which said housing is provided with air discharge channel means connected with said chamber at both sides of said piston, and means on said valve member for closing said discharge channel means at the side of said piston acted upon by said pressure medium when said valve member is in said end positions, while maintaining at the same time said discharge channel means at the side of said piston which is not acted upon by said pressure medium in an open position.

* * * * *